United States Patent
Coelho Alves et al.

(10) Patent No.: US 12,514,511 B2
(45) Date of Patent: Jan. 6, 2026

(54) WIRELESS CONNECTIONS BETWEEN DEVICES OF MOTION TRACKING SYSTEM AND AUTHENTICATION OF A USER THEREOF

(71) Applicant: SWORD HEALTH S.A., Oporto (PT)

(72) Inventors: José Carlos Coelho Alves, Oporto (PT); Pedro Filipe Xavier Rodrigues, Oporto (PT); Márcio Filipe Moutinho Colunas, Oporto (PT); Luís António Correia De Oliveira, Oporto (PT); André Moura Rodrigues Nogueira, Oporto (PT); Virgílio António Ferro Bento, Oporto (PT)

(73) Assignee: SWORD HEALTH, S.A., Oporto (PT)

( * ) Notice: Subject to any disclaimer, the term of this patent is extended or adjusted under 35 U.S.C. 154(b) by 581 days.

(21) Appl. No.: 17/633,472

(22) PCT Filed: Jun. 14, 2021

(86) PCT No.: PCT/EP2021/065957
§ 371 (c)(1),
(2) Date: Feb. 7, 2022

(87) PCT Pub. No.: WO2021/259688
PCT Pub. Date: Dec. 30, 2021

(65) Prior Publication Data
US 2023/0108601 A1    Apr. 6, 2023

(30) Foreign Application Priority Data
Jun. 24, 2020   (EP) .................................. 20398006

(51) Int. Cl.
*A61B 5/00*    (2006.01)
*H04B 17/318*  (2015.01)

(52) U.S. Cl.
CPC .......... *A61B 5/7221* (2013.01); *A61B 5/0024* (2013.01); *A61B 5/6801* (2013.01); *H04B 17/318* (2015.01)

(58) Field of Classification Search
CPC ... A61B 5/7221; A61B 5/0024; A61B 5/6801; A61B 5/11; A61B 5/1114; A61B 5/1118;
(Continued)

(56) References Cited

U.S. PATENT DOCUMENTS

2020/0300972 A1* 9/2020 Wang .................. A61B 5/0002
2020/0366386 A1* 11/2020 Bugos ................. A61B 5/0022
(Continued)

FOREIGN PATENT DOCUMENTS

EP  3928685  12/2021
EP  3993693  5/2022
(Continued)

OTHER PUBLICATIONS

International Search Report issued Sep. 28, 2021 re: Application No. PCT/EP2021/055957, pp. 1-3, citing: Lu Shi et al. "BANA: Body Area Network Authentication . . . ", Wei Wang et al. "Detecting on-body device . . . ", Yong Huang et al. "Authenticating On-Body IoT Devices . . . " and Mubarak Umar et al. "Mutual Authentication in Body Area . . . ".
(Continued)

*Primary Examiner* — Garrett K Atkinson
(74) *Attorney, Agent, or Firm* — SCHWEGMAN LUNDBERG & WOESSNER, P.A

(57) ABSTRACT

A method for establishing wireless communications connections between sensors and a computing apparatus of a motion tracking system include the steps: processing radiofrequency signals received by the computing apparatus and transmitted by each sensor, each radiofrequency signal including an advertisement package of the respective sensor;
(Continued)

providing a number of RSSI per sensor based on the processed radiofrequency signals; computing and storing mean RSSI values based on the number of RSSI so that a number of RSSImean values is computed per sensor; computing velocities of change of RSSImean, vRSSI, based on the number of RSSImean values so that a number of vRSSI values is computed per sensor; establishing the wireless communications for which at least the following is fulfilled: the computing apparatus determines that at least some vRSSI values within a first period of the number of vRSSI values of each sensor has a modulus greater than a predetermined minimum velocity.

20 Claims, 5 Drawing Sheets

(58) Field of Classification Search
CPC .............. A61B 2503/10; H04B 17/318; A63B 24/0062; A63B 24/0087; A63B 2220/89; A63B 2220/75; A63B 2230/50; A63B 21/0724; A63B 2225/50; A63B 2220/807; A63B 2230/06; A63B 2220/72; A63B 2220/40; A63B 2220/12; A63B 21/0726; A63B 2225/54
See application file for complete search history.

(56) References Cited

U.S. PATENT DOCUMENTS

| | | | | |
|---|---|---|---|---|
| 2020/0397365 | A1* | 12/2020 | Zhang | G16H 50/20 |
| 2020/0405223 | A1* | 12/2020 | Mai | H04B 1/713 |
| 2022/0079694 | A1* | 3/2022 | Freiin Von Kapri | B25J 13/06 |
| 2022/0096003 | A1* | 3/2022 | Mai | H04L 25/0224 |
| 2022/0386945 | A1* | 12/2022 | Wu | A61B 5/1123 |
| 2023/0021342 | A1* | 1/2023 | Wang | A61B 5/0507 |
| 2023/0043643 | A1* | 2/2023 | Moutinho Colunas | A61B 5/749 |
| 2023/0081472 | A1* | 3/2023 | Wang | H04W 4/029 340/539.12 |

FOREIGN PATENT DOCUMENTS

| | | | |
|---|---|---|---|
| WO | 2019243438 | A1 | 12/2019 |
| WO | WO-2021259688 | A1 | 12/2021 |

OTHER PUBLICATIONS

Lu Shi et al., "BANA: Body Area Network Authentication Exploiting Channel Characteristics", IEEE Journal on Selected Areas in Communications, Sep. 2013, vol. 31, No. 9, pp. 1803-1816, XP011524980.

Mubarak Umar et al., "Mutual Authentication in Body Area Networks Using Signal Propagation Characteristics", IEEE Access, Apr. 2020, vol. 8, pp. 66411-66422, XP011784225.

Wei Wang et al., "Detecting On-Body Devices Through Creeping Wave Propagation", IEEE Infocom 2017—IEEE Conference On Computer Communications, 2017, pp. 1-9, XP033160580.

Written Opinion issued Sep. 28, 2021 re: Application No. PCT/EP2021/055957, pp. 1-6, citing: Lu Shi et al. "BANA: Body Area Network Authentication . . . ", Wei Wang et al. "Detecting on-body device . . . ", and Yong Huang et al. "Authenticating On-Body IoT Devices . . . ".

Yong Huang et al., "Authenticating On-Body IoT Devices: An Adversarial Learning Approach", IEEE Transactions of Wireless Communications, Aug. 2020, vol. 19, No. 8, pp. 5234-5245, XP011805549.

"International Application Serial No. PCT EP2021 065957, International Preliminary Report on Patentability mailed Jan. 5, 2023", 8 pgs.

"European Application Serial No. 20398006.5, Noting of loss of rights mailed Jul. 20, 2022", 2 pgs.

"European Application Serial No. 21730634.9, Response to Communication pursuant to Rules 161(1) and 162 EPC filed Feb. 2, 2022", 16 pgs.

"European Application Serial No. 21730634.9, Communication Pursuant to Article 94(3) EPC mailed Jun. 24, 2022", 4 pgs.

"European Application Serial No. 21730634.9, Response filed Aug. 11, 2022 to Communication Pursuant to Article 94(3) EPC mailed Jun. 24, 2022", 8 pgs.

"European Application Serial No. 21730634.9, Intention to grant mailed Feb. 12, 2022", 36 pgs.

Shi, Lu, "BANA: Body Area Network Authentication Exploiting Channel Characteristics", IEEE Journal on Selected Areas in Communications, IEEE Service Center, Piscataway, US, vol. 31. No. 9, (Sep. 1, 2013), 1803-1816.

EP Application No. 20398006.5 Extended European Search Report dated Dec. 14, 2020.

\* cited by examiner

WIRELESS CONNECTIONS BETWEEN DEVICES OF MOTION TRACKING SYSTEM AND AUTHENTICATION OF A USER THEREOF

TECHNICAL FIELD

The present disclosure relates to the technical field of motion tracking systems. More particularly, the present disclosure relates to establishing the wireless communications between sensors to be used of the motion tracking system and a computing apparatus thereof, and authenticating the user of the sensors whose motion is to be tracked.

BACKGROUND

Motion tracking or motion capture of a target is a technical process used in many applications, such as, control of machines, automatization of processes, or gait analysis to name a few. The motion of a person or an object can be tracked by means of sensors that are attached to the person or object. The sensors are inertial measuring units and the measurements thereof are indicative of the positions and angles of the tracked anatomical landmarks or body members; by processing these measurements, the motion of the tracked landmarks or body members (e.g. the range of motion) can be determined.

Such kind of sensors, i.e. wearable sensors, send the measurements thereof to a computing apparatus of the motion tracking system by means of wireless communications connections. The wireless connections allow the user to have the motion sequence thereof provided in real time or almost in real time and without requiring wired connections that hinder the movements of the user.

The wireless communications connections are established according to the wireless communications protocols used, yet in order to do so, the computing apparatus has to determine which sensors are the ones to establish the connections with. In order to track motion of a person, a multiplicity of sensors are necessary at once so that the different anatomical landmarks or body members of the user can be tracked, and when multiple sets of sensors radiate waves that arrive at the computing apparatus (with a power greater than a sensitivity thereof), tens or even hundreds of sensors are available for the potential establishment of wireless communications connections.

If the computing apparatus connects with a set of sensors not being used for motion tracking at that time, two undesired issues take place. On one hand, the correct set of sensors cannot be used by the user for tracking its motion as long as the wireless connections are not made between said set and the computing apparatus. And on the other hand, information relating to a user is provided to a different user, and/or information resulting from the subsequent motion tracking procedure is registered in relation to a different user. The latter issue is particularly problematic because when each set of sensors is assigned to a specific person, the computing apparatus will retrieve and/or register data incorrectly because it is assigned to said specific person. This problem is further exacerbated when the motion tracking procedure is part of a physical rehabilitation procedure as disclosed in international application no. PCT/EP2019/066237, for instance to recover from a hip injury, a shoulder injury, a neck injury, etc., the physical therapy program that the person is to follow as part of its rehabilitation process shall be provided to the user assigned to the specific set of sensors. Likewise, sensitive information about a person may be provided to another person when the wireless connections are established with the wrong set of sensors.

Therefore, it is deemed necessary to have a way of limiting the possibilities of both wrong wireless connections establishment in motion tracking systems with wearable sensors and wrong user identifications in said systems. Or, in other words, it is deemed necessary to have motion tracking systems and methods for such systems that reduce the chances of the computing apparatus connecting to an incorrect set of sensors among multiple sets of sensors whose radiofrequency signals reach the apparatus and, preferably, reduce the chances of the computing apparatus determining that the user of the set of sensors that it connects to is a user who has a different set of sensors assigned thereto.

SUMMARY

A first aspect of the disclosure relates to a method for establishing wireless communications connections between a plurality of sensors of a motion tracking system and a computing apparatus of the motion tracking system, each sensor being adapted for arrangement on a body of the user, comprising:

processing, by the computing apparatus, radiofrequency signals received by the computing apparatus and transmitted by each sensor of the plurality of sensors, each radiofrequency signal including an advertisement package of the respective sensor;

providing, by the computing apparatus, a plurality of received signal strength indicators, RSSI, per each sensor of the plurality of sensors based on the processed radiofrequency signals;

computing and storing, by the computing apparatus, mean RSSI values, $RSSI_{mean}$, based on the pluralities of RSSI so that a plurality of $RSSI_{mean}$ values is computed per sensor;

computing, by the computing apparatus, velocities of change of $RSSI_{mean}$, $v_{RSSI}$, based on the pluralities of $RSSI_{mean}$ values so that a plurality of $v_{RSSI}$ values is computed per sensor;

establishing, by the computing apparatus, the wireless communications connections between the computing apparatus and a set of sensors of the plurality of sensors for which at least the following is fulfilled: the computing apparatus determines that at least some $v_{RSSI}$ values within a first time period of the plurality of $v_{RSSI}$ values of each sensor of the set of sensors has a modulus greater than a predetermined minimum velocity, the predetermined minimum velocity being equal to or greater than zero.

The computing apparatus of the motion tracking system provides motion sequences of one user at a time, in particular for that user whose sensors have established wireless communications connections with the computing apparatus. This means that different sets of sensors among the plurality of sensors can be used for providing motion sequences, yet the computing apparatus is to determine which set of sensors is to be used based on the RSSI values corresponding to each sensor and, more particularly, the velocity of variation thereof. Each sensor comprises or has an inertial measuring unit, namely an IMU, comprising one or more of: an accelerometer, a gyroscope and a magnetometer.

The apparatus determines the RSSI for the radiofrequency signals it receives from each sensor, in this way the apparatus has some indicator values per sensor that provides electromagnetic waves captured by the apparatus when the sensors transmit advertisement packages. The advertisement packages include public identification data of each sensor and the contents thereof depend on the wireless communications protocol or standard used.

In order to reduce influence of interferences or sporadic phenomena that affect the strength of the radiofrequency signals captured by the apparatus, the apparatus computes the $RSSI_{mean}$ values in relation to each sensor for which RSSI is being provided, therefore each such sensor has a plurality of $RSSI_{mean}$ values computed and stored by the apparatus over time. The apparatus computes the $RSSI_{mean}$ values by averaging the different RSSI values of each sensor.

When the computing apparatus computes $RSSI_{mean}$ values, it stores each $RSSI_{mean}$ value along with a timestamp indicative of the moment in time when said $RSSI_{mean}$ value has been calculated. In this sense, $RSSI_{mean}$ values are computed each time the apparatus provides a new RSSI value for the sensor, therefore for each sensor there is a $RSSI_{mean}$ value considered to be the current $RSSI_{mean}$ and when a new RSSI value is provided, said current $RSSI_{mean}$ is stored as the previous $RSSI_{mean}$ with its corresponding timestamp, and the newest $RSSI_{mean}$ computes takes its place as current $RSSI_{mean}$.

The computing apparatus determines which sensors are intended to be user for a motion tracking procedure according to the $v_{RSSI}$ values, therefore the apparatus computes the plurality of $v_{RSSI}$ values for each sensor; to this end, the apparatus takes the first derivatives of the plurality of $RSSI_{mean}$ values for each sensor. The computing apparatus takes into account the timestamps of the $RSSI_{mean}$ values for computing the $v_{RSSI}$.

The wireless communications connections are only established with at least some sensors of the plurality of sensors (said some sensors define the set of sensors) for which at least some $v_{RSSI}$ values have the modulus greater than the predetermined minimum velocity, e.g. min_velocity. This means that two or more $v_{RSSI}$ values of each sensor and within the first time period shall fulfill: $|v_{RSSI}| \geq$ min_velocity In this way, the apparatus does not connect with sensors being static or not moving in such a way so as to get closer to or farther away from the computing apparatus according to the velocity of variation of their respective RSSI.

The apparatus reduces the establishment of incorrect connections by way of the mean RSSI values, the need of the two or more $v_{RSSI}$ values per sensor whose modulus is greater than min_velocity, and the need of said two or more $v_{RSSI}$ values to be within the first time period. Since multiple sensors are carried (e.g. in the hand, in a sensor station, in a bag, etc.) and, optionally, worn by a same user for tracking the motion thereof, the motion of all those sensors relative to the computing apparatus needs to be equal or similar. Should one sensor not move in the same way with respect to the others, then said sensor is not being carried or worn by the user.

The predetermined minimum velocity can be e.g. 0 dB/s or a value greater than that, e.g. 0.2 dB/s, 0.5 dB/s, etc.

In some embodiments, the connections are established between the computing apparatus and the set of sensors for which the following is further fulfilled: the computing apparatus determines that the some $v_{RSSI}$ values of each sensor of the set of sensors are greater than the predetermined minimum velocity.

The apparatus further reduces the establishment of incorrect connections in this way since the sensors of the set of sensors shall have two or more $v_{RSSI}$ values (within the first time period) that are greater than min_velocity, namely they shall fulfill: $v_{RSSI} \geq$ min_velocity This means that the user of the sensors has to be getting closer to the computing apparatus for making the establishment of connections possible.

In some embodiments, the connections are established between the computing apparatus and the set of sensors for which the following is further fulfilled:

the computing apparatus determines that one or more $v_{RSSI}$ values within a second time period of the plurality of $v_{RSSI}$ values of each sensor of the set of sensors are within a predetermined velocity range, the predetermined velocity range at least comprising a value of zero; and the computing apparatus determines that the $RSSI_{mean}$ values for computing each $v_{RSSI}$ of said one or more $v_{RSSI}$ values are greater than a predetermined motionless threshold.

The computing apparatus only establishes the connections with those sensors that the apparatus further considers that are motionless, in another period of time, thereby avoiding connections with sensors not to be used in a motion tracking procedure.

In the second time period, which does not include the first time period and is not included in the first time period (i.e. the first and second time periods do not overlap in time), the sensors of the set of sensors need to have $RSSI_{mean}$ values with a velocity of variation thereof within the predetermined velocity range, e.g. [min_motionless_velocity, max_motionless_velocity]. That is to say, one or more $v_{RSSI}$ values in that period shall fulfill: min_motionless_velocity<$v_{RSSI}$<max_motionless_velocity.

In addition, during the second time period, the $RSSI_{mean}$ values (e.g. rssi_no_movement) shall be greater than the predetermined motionless threshold, e.g. max_rssi_threshold. That is to say, the $RSSI_{mean}$ values for said one or more $v_{RSSI}$ values shall fulfill: rssi_no_movement>max_rssi_threshold.

The predetermined velocity range preferably has the limits thereof as close as possible to zero, e.g. −0.50 and 0.50 dB/s, −0.25 and 0.25 dB/s, etc. Accordingly, the variation of the $RSSI_{mean}$ in the second time period is zero or about zero.

The predetermined motionless threshold may be established in accordance with the RSSI levels expected from the communications modules of the sensors and/or the wireless communications protocols or standards used. By way of example, max_rssi_threshold is e.g. −65 dBm, −60 dBm, −50 dBm, or greater or lower values.

In some embodiments, a time difference either between an end of the first time period and a start of the second time period, or between an end of the second time period and a start of the first time period does not exceed a predetermined time threshold.

The movement and motionless behaviors of the sensors shall take place one after the other without a delay exceeding the predetermined time threshold for the computing apparatus to establish wireless connections. Otherwise, the computing apparatus considers that the sensors are not those to be used in the motion tracking procedure and, thus, does not establish connections with them.

In some embodiments, the second time period takes place after the first time period. In some other embodiments, the second time period takes place before the first time period.

The period in which the sensors shall remain motionless for the computing apparatus to determine that the wireless connections are to be established can take place after the period in which the $v_{RSSI}$ values (the modulus or the actual value thereof) shall be greater than the predetermined minimum velocity, or before said period.

In some embodiments, when the set of sensors comprises a number of sensors greater than a number of wireless communications connections that the computing apparatus can have established, the computing apparatus establishes connections with the sensors of the set of sensors having the $RSSI_{mean}$ values for computing each $v_{RSSI}$ of said one or more $v_{RSSI}$ values that have a smallest difference with respect to the $RSSI_{mean}$ values for computing each $v_{RSSI}$ of said one or more $v_{RSSI}$ values of other sensors of the set of sensors.

The apparatus establishes connections with as many sensors as it can. The maximum number of connections that the apparatus can establish depends upon the limitations of the communications module of the apparatus, and/or depends upon the limitations of the wireless communications protocol or standard used.

Among all sensors that fulfill the requirements for establishing the connections, the apparatus establishes them with the sensors that have their $RSSI_{mean}$ values most similar within a same time period (preferably the second time period, but also possible with the first time period); that is to say, the $RSSI_{mean}$ values of the different sensors shall be as similar as possible to establish the connections. This is so because the distance of the sensors to the computing apparatus is to be the same or substantially the same as the sensors are carried or worn by a single user, therefore their corresponding $RSSI_{mean}$ values should be indicative of such same or substantially the same distance. In this sense, differences between the $RSSI_{mean}$ values of each possible pair of sensors are computed, and the set of sensors resulting in a sum of the differences to be the lowest is the set of sensors with which the computing apparatus establishes the wireless communications connections.

In some embodiments, the method further comprises not establishing, by the computing apparatus, wireless communications connections between the computing apparatus and one or more sensors of the plurality of sensors for which at least one of the criteria for establishing the wireless communications connections is not fulfilled.

In this sense, for not establishing the connections the following must be fulfilled: the computing apparatus determines that at least not some sensors of the plurality of sensors have the at least some $v_{RSSI}$ values within the first period whose modulus is greater than the predetermined minimum velocity. And/or at least one of the following must be fulfilled in those embodiments in which the respective criteria are considered: the computing apparatus determines that at least not some sensors of the plurality of sensors have the at least some $v_{RSSI}$ values within the first period that are greater than the predetermined minimum velocity; the time elapsed between the RSSI values used for computing the respective $v_{RSSI}$ of the plurality of $v_{RSSI}$ values for each sensor is not within the predetermined RSSI time range; the computing apparatus determines that no $v_{RSSI}$ value within the second time period of the plurality of $v_{RSSI}$ values of each sensor is within the predetermined velocity range; the computing apparatus determines that no $RSSI_{mean}$ value for computing each $v_{RSSI}$ of the one or more $v_{RSSI}$ values is greater than the predetermined motionless threshold; and the time difference is greater than the predetermined time threshold.

In some embodiments, the method further comprises, after establishing the connections, not establishing, by the computing apparatus, any wireless communications connections between the computing apparatus and sensors different from those of the set of sensors until the established connections are first terminated.

The computing apparatus does not connect to any other sensor of the plurality of sensors once it has established the connections with the sensors of the set of sensors. In this way, establishment of wireless communications connections with sensors that fulfill the requirement(s) for performing a motion tracking procedure is avoided.

Otherwise, measurements of different sets of sensors could get mixed up during a motion tracking procedure. Additionally or alternatively, data belonging to a user would be provided to a different user too (e.g. the routine with physical exercises prescribed for the user would be presented to the other user too, personal and possibly sensitive information of the user would be presented to the other user too, etc.), and/or data belonging to the user would be superseded or complemented with data of the different user (e.g. the different user indicates her/his current health condition, the different user requests the performance of other physical exercises, etc.).

In some embodiments, the method further comprises, after establishing the connections:
processing, by the computing apparatus, radiofrequency signals received by the computing apparatus and transmitted by each sensor of the set of sensors when the wireless communications connections are established, each radiofrequency signal including first identification data of the respective sensor;
processing, by the computing apparatus, the first identification data of the radiofrequency signals; and
one of:
authenticating the user, by the computing apparatus, when the processed respective first identification data for all sensors of the set of sensors match or cooperate with corresponding second identification data for each respective sensor, the corresponding second identification data being stored in or being digitally accessible by the computing apparatus together with identification data of the user;
terminating, by the computing apparatus, the wireless communications connections between the computing apparatus and all the sensors of the set of sensors when the processed respective first identification data of at least one sensor of the set of sensors does not match or cooperate with corresponding second identification data for the respective at least one sensor.

Whenever the wireless communications connections are established, secrets like identification data can be exchanged between the sensors and the computing apparatus for authentication of the user.

Each sensor sends identification data to the apparatus through its wireless communications connection so that the apparatus may authenticate the user or, alternatively, not authenticate the user and, therefore, terminate the connections. The first identification data is either to match, i.e. coincide, with the second identification data, or to cooperate, i.e. combine, with the second identification data for the authentication as it is known in the technical field of digital authentication. The second identification data is stored alongside data for identification of the user, therefore the computing apparatus has or can access both data for authentication of the user.

Should a set of sensors attempt to be used in a motion tracking procedure with the computing apparatus and which does not have second identification data stored in or accessible by (e.g. stored in a server, the cloud, etc. that the computing apparatus can access to via a wired or wireless connection) the computing apparatus, the apparatus does not authenticate the user. Such set of sensors could belong to a different motion tracking system, or not belong to any motion tracking system but be used by a third party that attempts to gain unauthorized access to data of users.

In some embodiments, the first identification data of the radiofrequency signals comprises at least one of an identity or a key of the respective sensor. In some of these embodiments, each identity or key is at least one of: a serial number of the sensor, a MAC address of a communications module of the sensor, and a digital token stored in at least one memory of the sensor.

In some embodiments, the user is authenticated further when the computing apparatus processes third identification data and determines that the third identification data match or cooperate with fourth identification data for the user, the third identification data comprising one or more user input passcodes and/or identification data of a wireless user equipment, and the fourth identification data being stored in or being digitally accessible by the computing apparatus and associated with the second identification data. Further, in some of these embodiments, the connections are terminated when the computing apparatus determines that the third identification data does not match or cooperate with the fourth identification data.

The user is required to provide additional identification data for authenticating herself/himself prior to the motion tracking procedure. To this end, the user is to manually input one or more passcodes that identify her/him based on the fourth identification data. For example, the computing apparatus may comprise user input means (e.g. a physical or digital keyboard) for inputting the passcodes in the computing apparatus itself, or request the inputting of the one or more passcodes via another device, for instance a wireless user equipment (e.g. a mobile phone, a tablet, a personal computer, a smartwatch) that transmits the inputted passcode(s) to the computing apparatus via a wired or wireless communications link.

The third identification data may also be the digital transmission of identification data stored in the wireless user equipment. For instance, the user is to pair the wireless user equipment with the computing apparatus for exchange of secrets between said equipment and the apparatus via e.g. a Bluetooth communication, an NFC communication, etc. as known in the art.

The fourth identification data is stored in the computing apparatus or in another device digitally accessible by the apparatus along with the second identification data. In this way, each set of sensors can only have one user for use thereof. Upon validating the first identification data with the second identification data, the computing apparatus is to process the third identification data received with the fourth identification data assigned to that second identification data for authenticating the user.

In some embodiments, the method further comprises, after authenticating the user, retrieving, by the computing apparatus, a routine of exercises to be performed by the authenticated user. In some embodiments, the computing apparatus presents or causes to present the retrieved routine. In some embodiments, the method further comprises, after authenticating the user, processing, by the computing apparatus, radiofrequency signals received by the computing apparatus and transmitted by each sensor of the plurality of sensors when the user is authenticated such that measurements included in the said radiofrequency signals are processed in order to provide a motion sequence of the user. In some embodiments, the method further comprises registering, by the computing apparatus, the motion sequence provided together with data indicative of the authenticated user.

In some embodiments, the method further comprises, after authenticating the user, terminating, by the computing apparatus, the wireless communications connections between the computing apparatus and one or more sensors of the set of sensors when the routine of exercises to be performed by the authenticated user requires only a subset of sensors of the set of sensors.

For instance, when the set of sensors comprises six sensors, but only four of them are required for the motion tracking procedure because the anatomical landmarks or body members of the user can be tracked with e.g. four sensors, the computing apparatus can terminate the connections with two of the sensors for saving energy of both the computing apparatus and the disconnected sensors.

In some embodiments, the wireless communications connections are established when the following is further fulfilled: the computing apparatus determines that a time elapsed between at least one pair of $v_{RSSI}$ values of the plurality of $v_{RSSI}$ values of each sensor of the set of sensors is within a predetermined motion time range.

For establishing the connections, the apparatus requires that the two or more $v_{RSSI}$ values (in the first time period) of each sensor are within the predetermined motion time range, e.g. [min_rssi_increase_time, max_rssi_increase_time], so that too slow or too fast moving sensors are not to be used in a motion tracking procedure. Therefore, a time difference between two or more $v_{RSSI}$ values of each sensor shall fulfill:

$$\text{min\_rssi\_increase\_time} < \Delta t|_{v_{RSSI}} < \text{max\_rssi\_increase\_time}$$

By way of example only, min_rssi_increase_time can be 500 milliseconds, 1 second, etc. and max_rssi_increase_time can be 10 s, 5 s, 2.5 s, etc.

In some embodiments, the plurality of $v_{RSSI}$ values for each sensor is computed such that a time elapsed between the $RSSI_{mean}$ values used for computing the respective $v_{RSSI}$ values are within a predetermined $RSSI_{mean}$ time range.

The computing apparatus does not permanently wait for having $RSSI_{mean}$ values with which it can compute the respective $v_{RSSI}$ values. In this sense, the computing apparatus considers the sensors from which it receives radiofrequency signals within the predetermined $RSSI_{mean}$ time range as candidates for potential wireless communications connections establishments. When the $RSSI_{mean}$ values are too spaced apart in time, the computing apparatus determines that the respective $v_{RSSI}$ value is zero and, thus, the corresponding sensor is at that time not a potential candidate for connection. It can also occur that the sensor is turned off or its radiofrequency signals do not reach the computing apparatus, hence the predetermined $RSSI_{mean}$ time range reduces the computational burden of the computing apparatus and improves the procedure for connecting with the sensors to be used.

Further, the computing apparatus neither considers sensors as candidates for potential connections establishment when the $v_{RSSI}$ values are computed with $RSSI_{mean}$ values provided in short periods of time (i.e. periods of time not being within the predetermined $RSSI_{mean}$ time range) because the resulting values are not representative of the behavior of the sensors.

When the computing apparatus discards one or more sensors for the connection because the time elapsed between $RSSI_{mean}$ values is not within the predetermined $RSSI_{mean}$ time range, this discarding is not permanent. When said one or more sensors provide radiofrequency signals later on and the time elapsed between $RSSI_{mean}$ values is within the predetermined $RSSI_{mean}$ time range, the computing apparatus takes the sensor or sensors into account once again.

The predetermined $RSSI_{mean}$ time range has lower and upper limits e.g. [min_detection_rssi_time, max_detection_rssi_time] with values that can be selected, for example, based on the environment where the motion tracking system is located, so when more sensors are expected to be in the environment the limits are more restrictive, and vice versa, when fewer sensors are expected to be in the environment the limits are less restrictive. The limits can also be set based on tests. By way of example, min_detection_rssi_time can be 100 ms, 200 ms, 400 ms, etc. and max_detection_rssi_time can be 500 ms, 1 s, 1.5 s, etc.

In some embodiments, the computing apparatus comprises at least one sensor, the at least one sensor comprising an accelerometer and/or a gyroscope; and the connections are established between the computing apparatus and the set of sensors when the following is further fulfilled: measurements of the at least one sensor within the first time period are indicative of the computing apparatus being motionless. In some embodiments, the connections are established between the computing apparatus and the set of sensors when the following is further fulfilled: measurements of the at least one sensor within the second time period are indicative of the computing apparatus being motionless.

The establishment of wireless communications connections cannot be due to the movement of the computing apparatus, which would otherwise influence the RSSI provided for each sensor. The measurements of the at least one sensor, e.g. motion sensor, of the computing apparatus shall be indicative of a substantially still computing apparatus, thus the mean thereof is within a predetermined motionless apparatus range that includes a value of zero. Said range has the limits thereof as close as possible to zero, e.g. −0.20 and 0.20 m/s$^2$, −0.10 and 0.10 m/s$^2$, etc. in the case of measurements of accelerometers, e.g. −5 and 5°/s (i.e. degrees per second), −2 and 2°/s, etc. in the case of measurements of gyroscopes, etc.

In some embodiments, the method further comprises: presenting or causing to present, by the computing apparatus, information relative to one or more of: a criterion or criteria to be fulfilled by the sensors for establishment of the wireless communications connections; status of establishment of the wireless communications connections (e.g. whether the connections have been made, terminated, etc.); and indications of which criterion or criteria are not met by the sensors for establishment of the wireless communications connections.

In some embodiments, the method further comprises: the user moving within the first time period such that a distance between the user and the computing apparatus is progressively reduced or increased, the user having the sensors of the set of sensors arranged on a body thereof. In some of these embodiments, the method further comprises: the user remaining static or moving within the second time period such that a distance between the user and the computing apparatus does not change.

A second aspect of the disclosure relates to a data processing apparatus comprising at least one processor adapted to perform a method according to the first aspect of the invention.

A third aspect of the disclosure relates to a motion tracking system comprising:
 a plurality of sensors, each sensor being adapted for arrangement on a body of the user, and each being further adapted to at least radiate radiofrequency signals with respective advertisement packages and measurements of the respective sensor; and
 one of:
  a computing apparatus adapted to at least capture the radiofrequency signals, and comprising at least one processor adapted to perform a method according to the first aspect of the invention; and
  a data processing apparatus according to the second aspect of the invention.

The motion tracking system is capable of establishing which sensors of the plurality of sensors are to be used for the motion tracking procedure so that a user can physically exercise. The sensors for the motion tracking procedure have wireless communications connections set with the computing apparatus or the data processing apparatus. Preferably, the motion tracking system also authenticates (or not) the user wearing the sensors for the motion tracking procedure.

A fourth aspect of the disclosure relates to a computer program product that has instructions which, when executed by a computing apparatus, cause the computing apparatus to perform a method according to the first aspect of the invention.

Upon running the computer program product on one or more processors of the computing apparatus, the computing apparatus establishes wireless communications connections with specific wearable sensors (i.e. IMUs) of a motion tracking system thereof. Preferably, upon running the computer program product the computing apparatus additionally authenticates the user of the sensors once the wireless connections have been established.

In some embodiments, the computer program product is embodied on a non-transitory computer-readable medium or a computer-readable data carrier has the computer program product stored thereon.

A fifth aspect of the disclosure relates to a data carrier signal carrying a computer program product according to the fourth aspect of the invention.

Similar advantages as those described for the first aspect of the disclosure are also applicable to the second, third, fourth and fifth aspects of the invention.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the disclosure can be carried out. The drawings comprise the following figures.

DETAILED DESCRIPTION OF THE DRAWINGS

Figure 1:
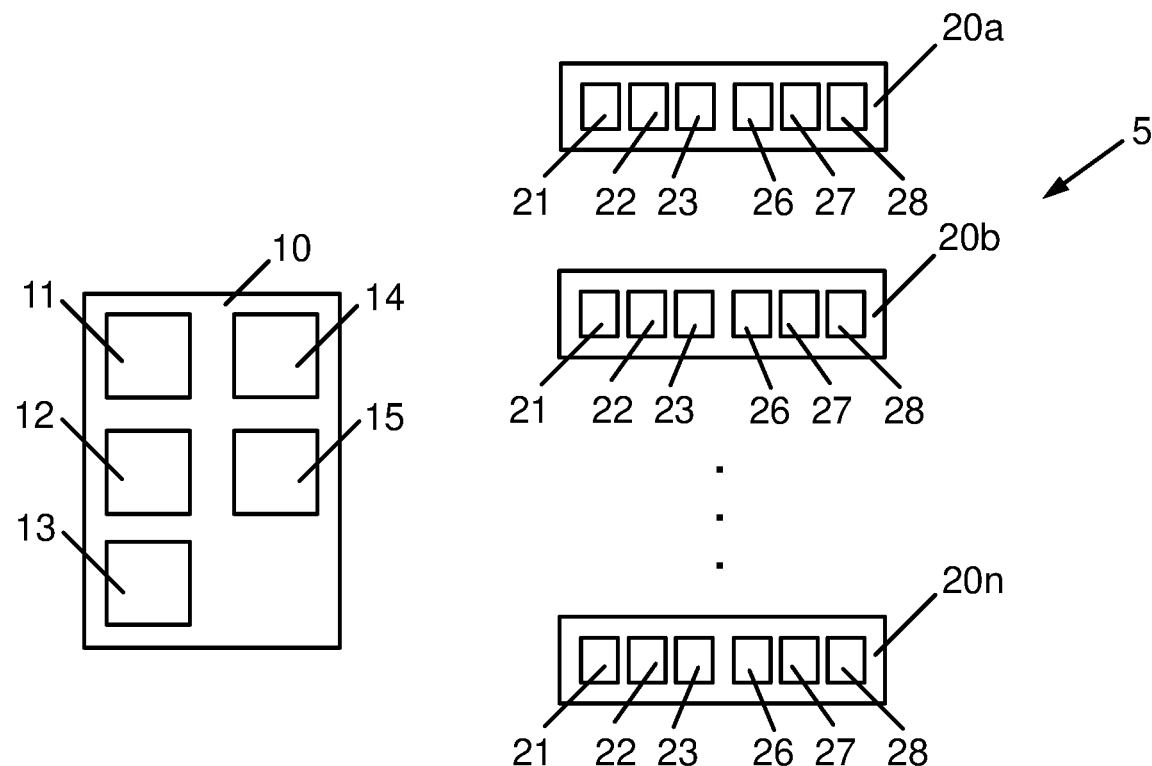
FIG. 1 diagrammatically shows a motion tracking system in accordance with embodiments.

FIG. 1 diagrammatically shows a motion tracking system 5 in accordance with embodiments. The motion tracking system 5 includes a plurality of sensors 20a-20n and a computing apparatus 10, which may be e.g. a tablet, a mobile phone, a personal computer, etc.

Each sensor 20a-20n is adapted to be arranged on the body of a user so that the measurements provided by each sensor 20a-20n can be processed by the computing apparatus 10, thereby providing a motion sequence of the user. Each sensor 20a-20n is an inertial measurement unit that includes one or more sensing devices selected from e.g. an accelerometer 21, a gyroscope 22 and a magnetometer 23. In the embodiment of FIG. 1, each sensor 20a-20n includes all three sensing devices 21-23, but in other embodiments the sensors only include an accelerometer 21 and a gyroscope 22, for instance. Preferably, all sensors 20a-20n include the same sensing devices 21-23.

The sensors 20a-20n further include at least one processor 26, at least one memory 27, and a first communications module 28 for transmitting radiofrequency signals to the computing apparatus 10 and which include e.g. advertisement packages, data packets with identification data (e.g. one or more identities, keys, etc.), data packets with measurements of the sensing device(s) 21-23, etc. When no wireless communications connections are established with the computing apparatus 10, the radiofrequency signals of the sensors 20a-20n include advertisement packages for indicating their presence and that they are active. Once the wireless communications connections are established (using a technology and protocol known by a skilled person, for instance but without limitation, Bluetooth and Bluetooth Low Energy communications, cellular network communications such as GSM, UMTS or LTE, wireless LAN communications, etc.) with the computing apparatus 10, the radiofrequency signals of the sensors 20a-20n may include identification data and/or the measurements. An antenna for radiating electromagnetic waves is provided as part of the first communications module 28. The same first communications modules 28, preferably, also enables the sensors 20a-20n to receive data from the computing apparatus 10 upon capturing electromagnetic waves with the antenna.

In some preferred embodiments, the at least one processor 26 of the sensors 20a-20n runs a sensor fusion algorithm for processing the measurements of the sensing devices 21-23 within the respective sensor. The sensor fusion algorithm is intended to enhance the raw measurements of the sensing devices by correcting errors thereof due to drifts of the sensing devices and, thus, outputs processed measurements that are to be transmitted to the computing apparatus 10.

The computing apparatus 10 includes at least one processor 11, at least one memory 12, and a second communications module 13 for at least receiving data. The second communications module 13 includes at least one antenna whereby electromagnetic waves may be captured, and then processed by the at least one processor 11.

The computing apparatus 10 preferably also includes at least one sensor 14 with one or more sensing devices like an accelerometer, a gyroscope and/or a magnetometer, and a screen 15. On said screen 15 the computing apparatus 10 is capable of showing instructions and/or information to the intended user about the wireless connection process. Likewise, the computing apparatus 10 may use the screen 15 in order to show the movements that are to be performed by an intended user of the motion tracking system 5 and feedback on the movements performed by the intended user during the motion tracking procedure. To this end, the computing apparatus 10 stores, in the at least one memory 12, data indicative of a correspondence between sensors and users assigned to those sensors, and also data relative to the physical exercises of intended users. Any of these data can be transmitted to and/or received from another electronic device thanks to the second communications module 13. For example, a therapist is able to receive the feedback at a computing apparatus in a hospital so as to monitor the evolution of the person. Based on the feedback received, the therapist is able to adjust the difficulty of the movement(s), the number of repetitions thereof, prescribe new movements, etc. so that the person may further exercise using the motion tracking system 5. Further, in addition to the screen 15, which provides visual feedback, the computing apparatus 10 may also include further visual output means (e.g. LEDs, animations), audio output means (e.g. loudspeakers), vibrating means (e.g. a vibrator), etc. for providing user perceptible signals in the form of sounds, vibration, animated graphics, etc.

Figure 2:
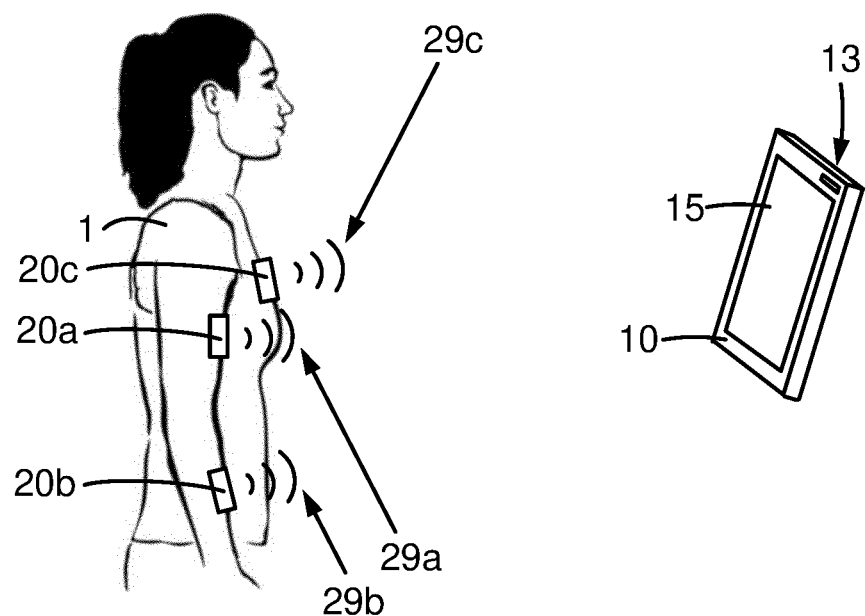
FIG. 2 shows a motion tracking system with sensors thereof arranged on a person that is the user thereof.

FIG. 2 shows a motion tracking system with sensors 20a-20c thereof arranged on a person that is the user 1 thereof.

The user 1 has a first sensor 20a attached to the right upper arm, a second sensor 20b attached to the right lower arm, and a third sensor 20c attached to the chest. The sensors 20a-20c may be attached to the body of the user 1 in a number of ways, for instance using straps, Velcro, etc.

At a distance from the user 1 is a computing apparatus 10 of the motion tracking system that is to process measurements of the sensors 20a-20c in order to provide the motion sequence of the user 1.

Each of the sensors 20a-20c provides radiofrequency signals by radiating electromagnetic waves 29a-29c whenever the sensors are transmitting data packets, which in turn are captured by the computing apparatus 10.

Figure 3A:
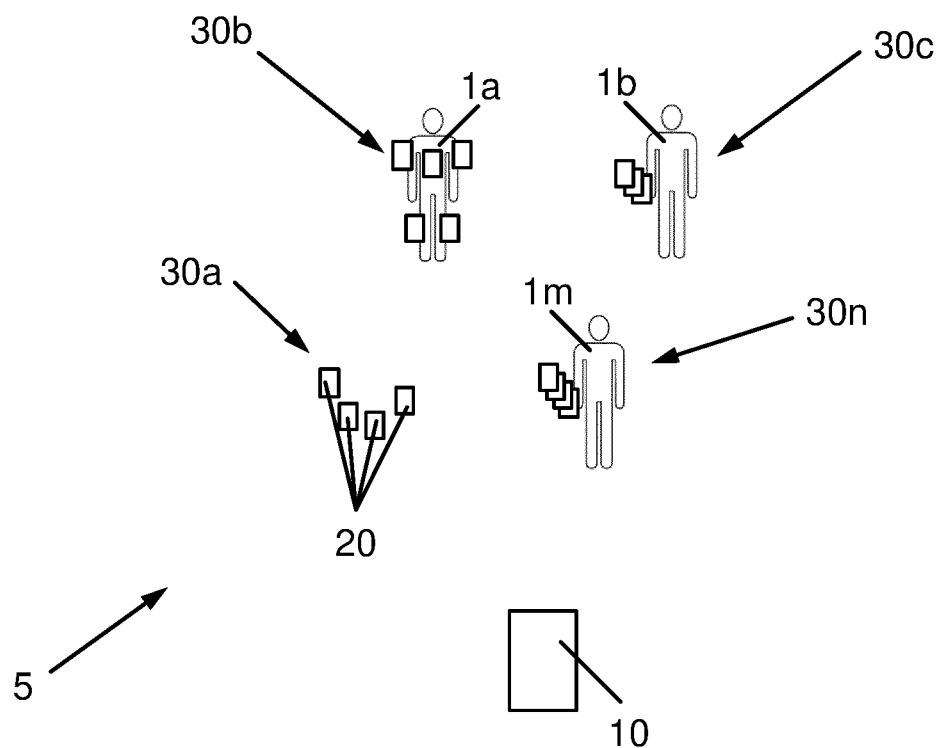
FIGS. 3A and 3B diagrammatically show a plurality of sensors of a motion tracking system prior to establishment of wireless communications connections in accordance with embodiments.
Figure 3B:
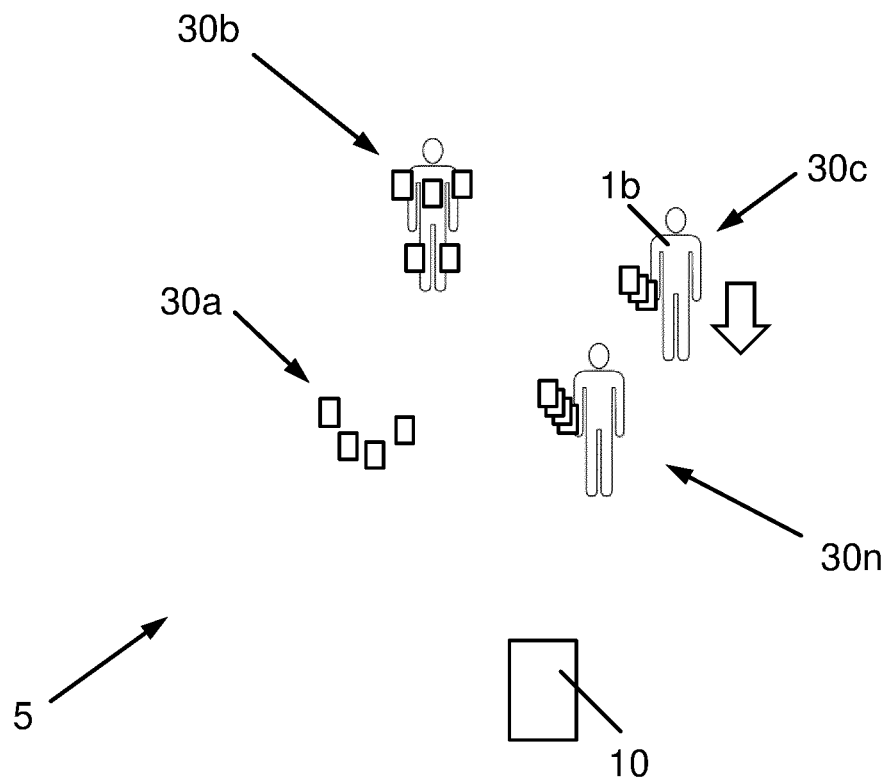

FIG. 3A diagrammatically shows a plurality of sensors of a motion tracking system prior to establishment of wireless communications connections, and FIG. 3B shows the same but with the movement of one of the users 1a-1c.

A plurality of sensors 20 (illustrated as magnified squares for the sake of clarity only) of a motion tracking system 5 that, for example, define N sets of sensors 30a-30n is active. For example, a first set of sensors 30a is on a table, a second set of sensors 30b is being worn by a first user 1a, a third set of sensors 30c is being carried by a second user 1b in a hand thereof, and an n-th set of sensors 30n is being carried by an m-th user 1m in a hand thereof.

The sensors 20 of each of these sets 30a-30n may be active but not connected with the computing apparatus 10 but with other computing apparatuses, or not connected with any computing apparatus at all. The sensors 20 may also be transmitting radiofrequency signals with advertisement packages therein for informing of their presence to other devices. The computing apparatus 10 receives, for example, electromagnetic waves of up to sixteen different sensors and cannot determine which of the sensors, if any, is to be used in a motion tracking procedure.

The computing apparatus 10 processes the captured electromagnetic waves in order to provide received signal strength indicators per sensor, which can be stored in a memory of the computing apparatus 10 along with a timestamp indicating when the radiofrequency signal was processed. The apparatus 10 can establish to which sensor each RSSI corresponds by way of the information contained in the advertisement packages, which indicates a public identity of the sensor it transmitted the advertisement package. Then, the computing apparatus 10 averages the RSSI of each sensor in order to provide mean received signal strength indicators per sensor, and stores them along with a timestamp indicating when the $RSSI_{mean}$ was computed. The computing apparatus 10 computes velocities of change of the $RSSI_{mean}$ per sensor to determine how its $RSSI_{mean}$ is evolving over time.

In FIG. 3B, the second user 1b is moving (as illustrated with the arrow) such that a distance of the set of sensors 30c thereof to the computing apparatus 10 changes, thereby changing the RSSI computed by the computing apparatus 10 upon reception of the radiofrequency signals transmitted while the second user 1b is moving. Based on the velocities of change of the $RSSI_{mean}$, the computing apparatus 10 may establish that the sensors 20 of the third set of sensors 30c is to be connected thereto and not the sensors 20 of the first, second and n-th sets of sensors 30a, 30b, 30d, whose velocities of change of the $RSSI_{mean}$ is substantially zero owing to the little or no movement at all to get closer to or farther away from the computing apparatus 10.

Figure 4A:
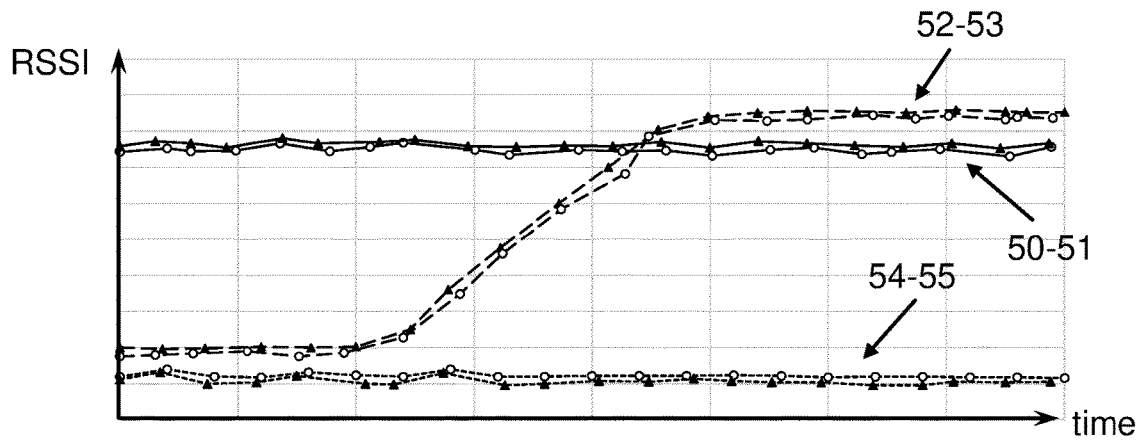
FIGS. 4A-4C and 5A-5C show graphs with examples of RSSI, $RSSI_{mean}$ and $v_{RSSI}$ computed by computing apparatuses in accordance with embodiments.
Figure 4B:
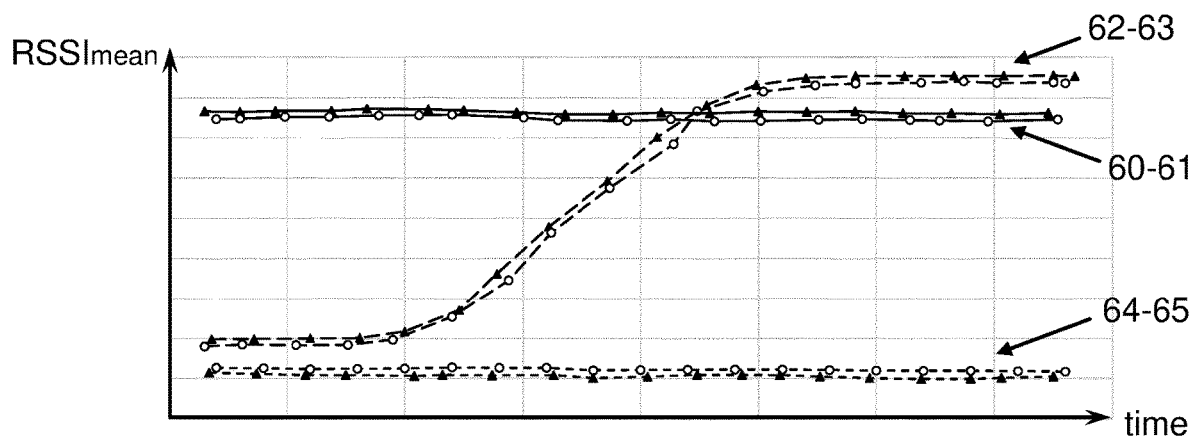
Figure 4C:
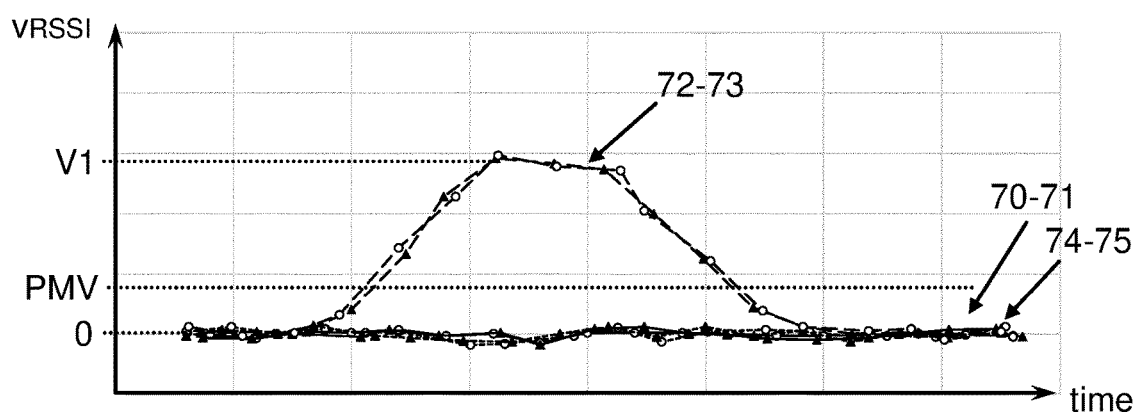

FIGS. 4A, 4B and 4C show the evolution over time of RSSI values, $RSSI_{mean}$ values, and $v_{RSSI}$ values, respectively, of six sensors.

For the sake of clarity only, the curves 50, 51, 60, 61, 70, 71 of two sensors of one set (e.g. first set) are shown with solid lines, the curves 52, 53, 62, 63, 72, 73 of two sensors of another set (e.g. second set) are shown with long-dash lines, and the curves 54, 55, 64, 65, 74, 75 of two sensors of yet another set (e.g. third set) are shown with short-dash lines. It is noted that the computing apparatus does not know which sensors belong to which set, this is only described in this manner for the sake of a clearer explanation only. Likewise, it is noted that even though curves are shown, these are only shown only for the sake of clarity, what the computing apparatus receives is discrete data packets (shown with circles and triangles) and usually not equally spaced in time since. Accordingly, the RSSI values are obtained upon receiving the packets, which are transmitted by the sensors at discrete times.

As it can be seen, the RSSI values 50-51, 54-55 of the sensors of the first and third sets do not change much over time, yet the RSSI values 52-53 of the second set increases during a time period. The value of the RSSI 50-55 can usually be correlated with the distance between the transmitting devices and the receiving device. In this sense, if for example the scenario of FIGS. 3A and 3B is considered, the sensors of the first set can be some sensors of the first user 1a, the sensors of the second set can be some sensors of the second user 1b, and the sensors of the third set can be some sensors of the m-th user 1m.

The $RSSI_{mean}$ values smooth the RSSI values and compensate for any spontaneous RSSI changes due to sporadic interferences for instance.

The $v_{RSSI}$ values are computed by deriving the $RSSI_{mean}$ values and show the variation thereof for all the sensors. In this case, the $v_{RSSI}$ values 70-71, 74-75 of both the first and third sets are zero or close to zero during the whole period of time represented in the graph, whereas the $v_{RSSI}$ values 72-73 of the second set are, during a period of time, greater than zero, particularly they reach a maximum value of V1.

When a computing apparatus requires that the modulus of $v_{RSSI}$ and, optionally, that $v_{RSSI}$ itself needs be greater than a predetermined minimum velocity PMV that is less than V1, then the sensors of the second set may fulfill said requirement and, thus, the computing apparatus can establish the wireless communications connections with them.

Figure 5A:
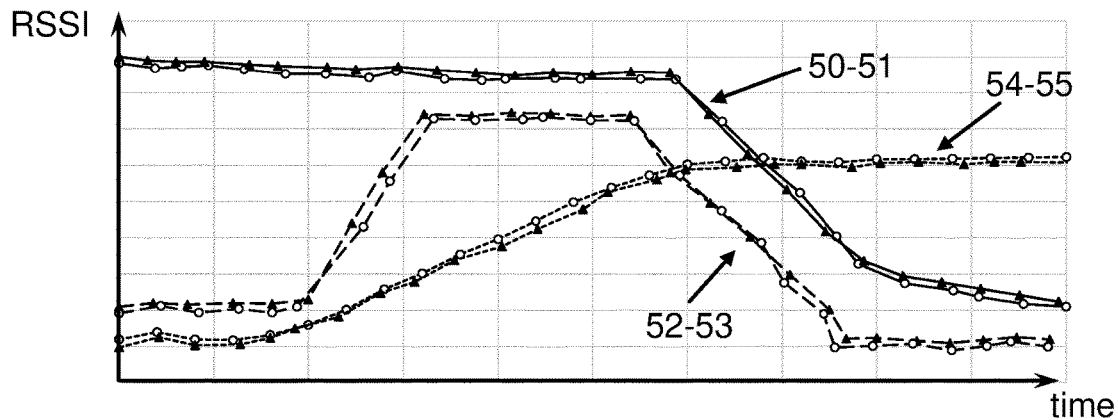
Figure 5B:
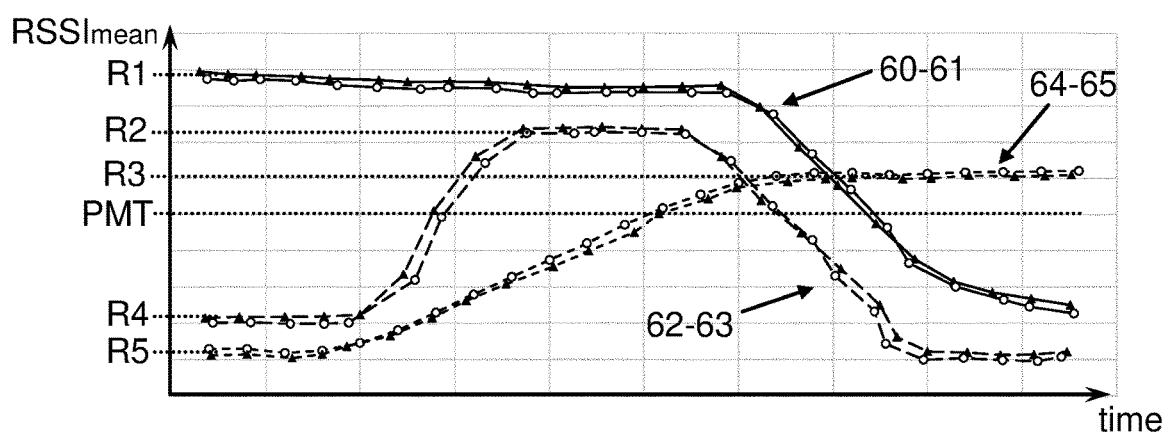
Figure 5C:
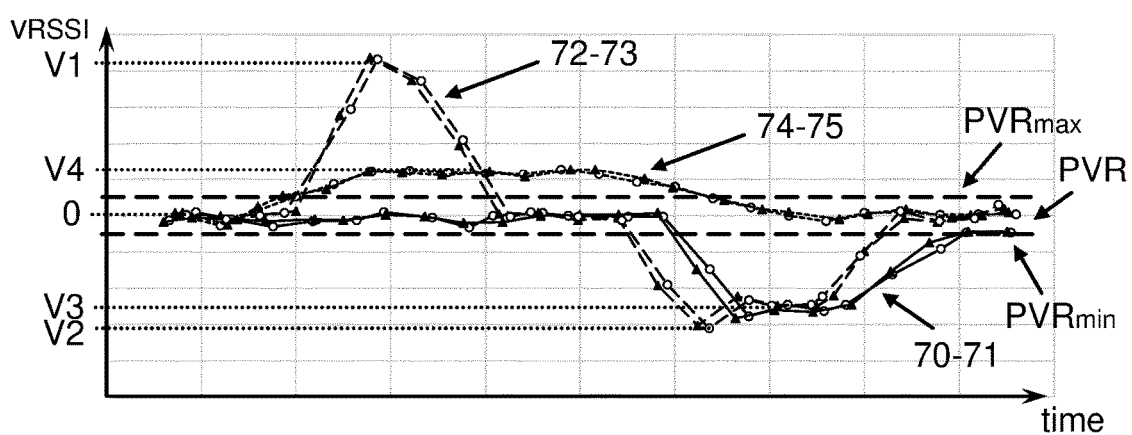

FIGS. 5A-5C show graphs analogous to those of FIGS. 4A-4C but with other exemplary behaviors of the respective sensors and, thus, of the RSSI values obtained by a computing apparatus of a motion tracking system.

In this example, according to the $RSSI_{mean}$ values 60-61 of R1, the sensors of the first set appear to be closer to the computing apparatus in comparison with the sensors of the other two sets. At a certain point in time, the sensors of the first set move away from the computing apparatus as illustrated by their RSSI 50-51 and $RSSI_{mean}$ values 60-61, but more clearly illustrated by their $v_{RSSI}$ 70-71 values, which are negative (reaching a minimum value of V3) during a period of time, and then become zero, which is indicative of no change in distance between the sensors and the computing apparatus.

In relation to the sensors of the second set, these sensors get closer to the computing apparatus as their $v_{RSSI}$ values 72-73 reach a maximum value of V1, then they remain at a substantially same distance from the computing apparatus. Later on, they get away from the computing apparatus with $v_{RSSI}$ values 72-73 reaching a minimum value of V2, and then they remain at a same distance from the computing apparatus.

The sensors of the third set are the ones farthest away from the computing apparatus at the beginning according to their $RSSI_{mean}$ values 64-65 of R5. Then, they get closer to the apparatus in a slow manner since the $v_{RSSI}$ values thereof 74-75 reach a value of V4 slightly above zero. Afterwards, they remain at an unvarying distance from the apparatus.

By way of example, the computing apparatus establishes wireless communications connections with sensors for which it determines that that:
  some $v_{RSSI}$ values within a first time period of the plurality of $v_{RSSI}$ values of each sensor of the set of sensors are greater than the predetermined minimum velocity, e.g. zero;
  one or more $v_{RSSI}$ values within a second time period of the plurality of $v_{RSSI}$ values of each sensor of the set of sensors are within a predetermined velocity range, e.g. PVR with limits $PVR_{max}$ and $PVR_{min}$; and
  the $RSSI_{mean}$ values for computing each $v_{RSSI}$ of said one or more $v_{RSSI}$ values are greater than a predetermined motionless threshold, e.g. PMT.

The first set of sensors does not have a first time period in which some $v_{RSSI}$ values thereof 70-71 are greater than zero, hence no connections are established with those sensors.

The second set of sensors has a first time period in which some $v_{RSSI}$ values thereof 72-73 are greater than zero (V1>0), has a second time period in which one or more $v_{RSSI}$ values thereof 72-73 are within the PVR range (e.g. at the beginning, between the periods in which the $v_{RSSI}$ is V1 and V2, at the end), and has the second time period in which $RSSI_{mean}$ values thereof 62-63 are greater than the PMT threshold (in the period between $v_{RSSI}$ equal to V1 and equal to V2, in which the $RSSI_{mean}$ is R2).

The third set of sensors has a first time period in which some $v_{RSSI}$ values thereof 74-75 are greater than zero (V4>0), has a second time period in which one or more $v_{RSSI}$ values thereof 74-75 are within the PVR range (e.g. at the beginning, at the end), and has the second time period in which $RSSI_{mean}$ values thereof 64-65 are greater than the PMT threshold (at the end, in which the $RSSI_{mean}$ is R3).

Both the second and third sets of sensors meet the requirements and, thus, the computing apparatus can establish the connections with those.

In some examples, since the sensors of the second set meet the requirements before (time-wise) the sensors of the third set, the computing apparatus establishes the connections with the sensors of the second set and does not establish any further connections, namely it does not establish connections with the sensors of the third set.

In some other examples, the computing apparatus waits a period of time for determining all the possible sensors that it can establish connections with, in this case with the second and third sets, and establishes the connections with all of them.

In both exemplary scenarios, the computing apparatus may proceed to authenticate the user once connected with the sensors. To this end, the apparatus processes the identification data sent by each sensor and authenticates the user or not based on the matching or cooperation of the identification data sent by all the sensors with corresponding identification data. For authentication of the user, all the sensors need have been assigned to the same user in e.g. a database, a server, a memory of the computing apparatus, etc.

Figure 6:
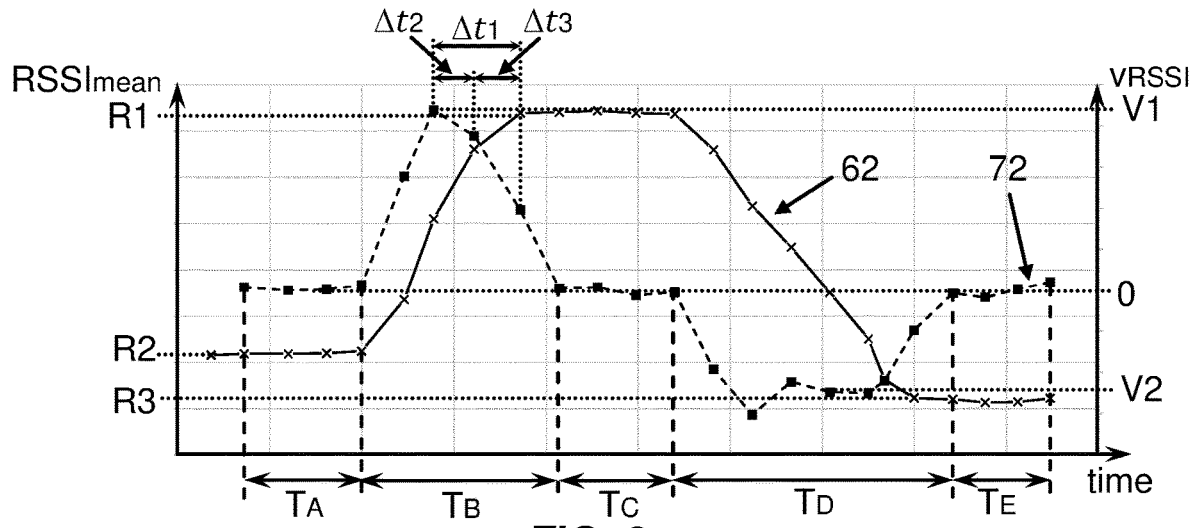
FIG. 6 shows a graph corresponding to some curves of FIGS. 5B and 5C with requirements to be met for establishing connections in accordance with embodiments.

FIG. 6 shows a graph corresponding to some curves of FIGS. 5B and 5C with requirements to be met for establishing connections in accordance with embodiments. For the sake of simplicity, the $RSSI_{mean}$ values 62 of a sensor of the second set are shown (with cross markers, and a solid line for the sake of clarity only) along with the $v_{RSSI}$ values 72 (with square markers, and a dashed line for the sake of clarity only) corresponding to the $RSSI_{mean}$ values 62.

In addition to the requirements set in the example described in relation to FIGS. 5A-5C, by way of another example, the wireless communications connections are established by the computing apparatus when it determines that a time elapsed between at least one pair of $v_{RSSI}$ of the plurality of $v_{RSSI}$ (of each sensor to which it is to connect to) is within a predetermined motion time range. The respective $v_{RSSI}$ values (i.e. the $v_{RSSI}$ values with the time elapsed between the predetermined motion time range) are those whose modulus or value thereof is greater than the predetermined minimum velocity as explained before. Therefore, for example in the time period $T_B$ or the time period $T_D$, at least the time elapsed between two $v_{RSSI}$ values (with square markers) within such time periods (including the endpoints of the time periods $T_B$ and $T_D$) shall fulfill: min_rssi_increase_time<$\Delta t|_{v_{RSSI}}$<max_rssi_increase_time. The two $v_{RSSI}$ values may not be consecutive but must be within the same time period; by way of example, any one of $\Delta t_1$, $\Delta t_2$, and $\Delta t_3$ shall fulfill said requirement.

The computing apparatus can also require that a time elapsed between $RSSI_{mean}$ values used for computing the respective $v_{RSSI}$ values are within a predetermined $RSSI_{mean}$ time range. This means that the time elapsed shall fulfill the following relationship: min_detection_rssi_time< $\Delta t|_{RSSImean}$<max_detection_rssi_time. The two $RSSI_{mean}$ values may not be consecutive but must be within the same time period; using the same $\Delta t_1$, $\Delta t_2$, and $\Delta t_3$ depicted by way of example only, any one of $\Delta t_1$, $\Delta t_2$, and $\Delta t_3$ shall fulfill said requirement.

It is noted that the discrete transmissions of the sensors represented in FIGS. 4A-4C, 5A-5C and 6 are transmissions before the computing apparatus has established wireless communications connections with any such sensor. Accordingly, in those discrete transmissions, the sensors include advertisement packages as known in the art for identification purposes. After establishing the connections with some sensors, the sensors may provide further transmissions with identification data thereof so that the computing apparatus is capable of authenticating the user based on the identification data.

Figure 7:
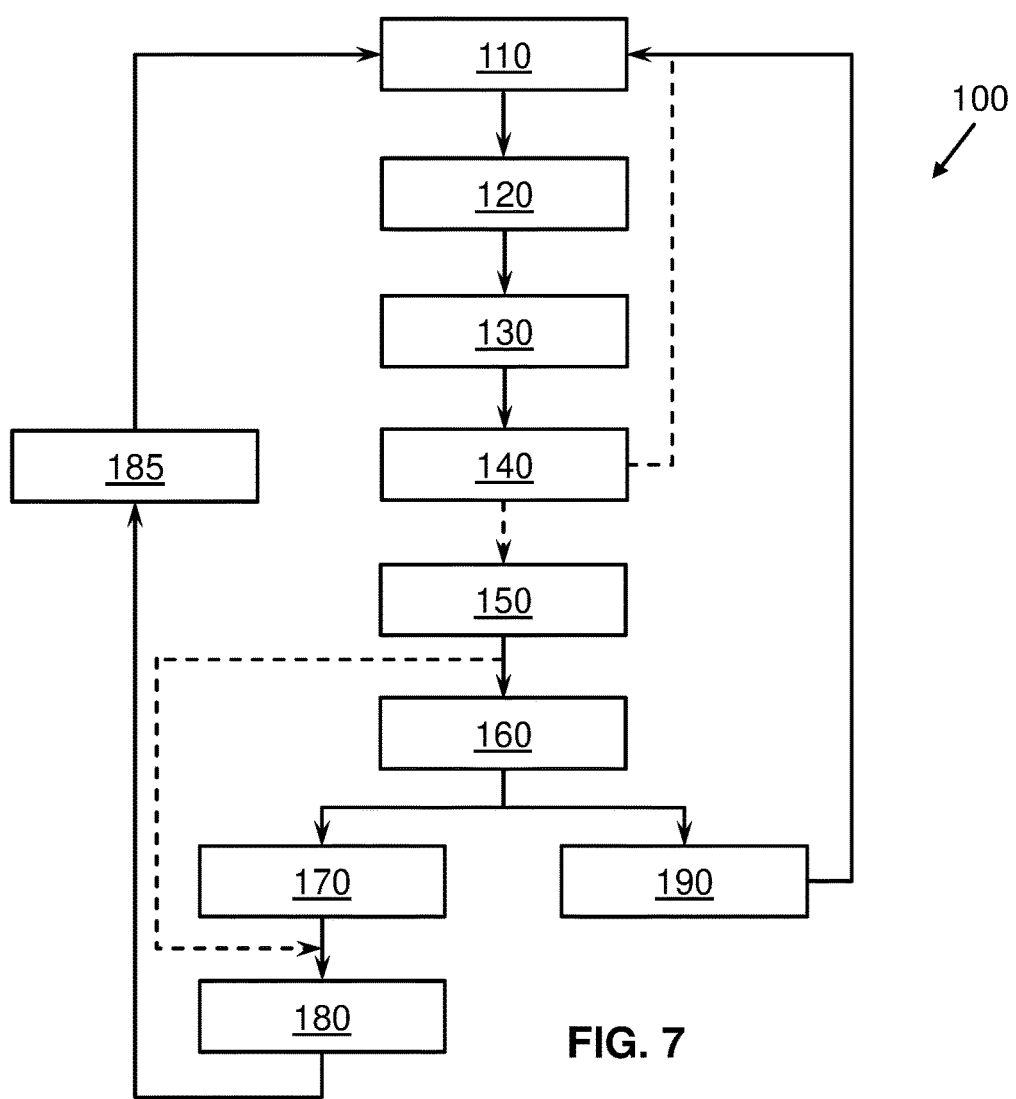
FIG. 7 diagrammatically shows methods in accordance with embodiments.

FIG. 7 diagrammatically shows methods 100 in accordance with embodiments.

The methods 100 comprise a step 110 whereby a computing apparatus (for example, the computing apparatus 10 of any one of FIGS. 1, 2, 3A-3B) of a motion tracking system (for example, the system 5 of any one of FIGS. 1, 2, 3A-3B) processes radiofrequency signals that sensors (for example, the sensors 20, 20a-20n of FIGS. 1, 2, 3A-3B) have transmitted by way of radiated electromagnetic waves and that the computing apparatus has received upon capturing the electromagnetic waves. Each radiofrequency signal includes an advertisement package of the respective sensor.

The methods 100 also comprise a step 120 whereby the computing apparatus provides a plurality of received signal strength indicators, RSSI, per each sensor of the plurality of sensors based on the radiofrequency signals processed 110.

The methods 100 also comprise a step 130 whereby the computing apparatus both computes and stores (in a memory of the computing apparatus, or in a device not belonging to the apparatus, e.g. a server, a cloud, etc.) mean RSSI values, $RSSI_{mean}$, based on the pluralities of RSSI provided 110 so that a plurality of $RSSI_{mean}$ values is computed and stored per sensor.

The methods 100 also comprise a step 140 whereby the computing apparatus computes velocities of change of $RSSI_{mean}$, $v_{RSSI}$, based on the pluralities of $RSSI_{mean}$ values so that a plurality of $v_{RSSI}$ values is computed per sensor. The $v_{RSSI}$ values are preferably also stored by the computing apparatus.

The methods 100 also comprise a step 150 whereby the computing apparatus establishes wireless communications connections between the computing apparatus and a set of sensors for which one or more requirements are met. When the requirements are not met, the computing apparatus does not establish the wireless communications connections and continues carrying out the above steps until the wireless connections can be established 150. In this sense, the arrow between steps 140 and 150, and between steps 140 and 110 are indicated with dashed lines to illustrate that one of the outcomes is produced each time.

The methods 100 may also comprise a step 160 after establishing 150 the wireless connections whereby the computing apparatus processes radiofrequency signals that the connected 150 sensors have transmitted by way of radiated electromagnetic waves and that the computing apparatus has received upon capturing the electromagnetic waves. Said radiofrequency signals are transmitted once the connections have been established 150 and include identification data of each respective sensor. The computing apparatus processes the identification data of the radiofrequency signals.

When the methods 100 comprise the step 160, they also comprise one or both of steps 170 and 190. In step 170, the computing apparatus authenticates a user of the set of sensors when the processed 160 identification data for the sensors of the set of sensors match or cooperate with corresponding identification data for each respective sensor that is stored in or is digitally accessible by the computing apparatus. In step 190, the computing apparatus does not authenticate the user because the identification data of the sensors does not match or cooperate with the corresponding identification data, and the computing apparatus terminates the connections established 150.

The methods 100 also comprise the step 180 whereby the computing apparatus processes radiofrequency signals that the connected 150 sensors have transmitted by way of radiated electromagnetic waves and that the computing apparatus has received upon capturing the electromagnetic waves. Said radiofrequency signals are transmitted once the connections have been established 150 and, preferably, once the user has been authenticated 170, however as shown with dashed lines, in some embodiments the steps 160, 170 and 180 are not present and the step 180 takes place after establishing 150 the wireless connections. The radiofrequency signals processed 180 by the computing apparatus include measurements of the sensors that it is connected to so that a motion sequence of the user is provided. In this sense, in step 180 the computing apparatus can retrieve a routine of physical exercises that the authenticated 170 user or the deemed user (if there is no authentication 170) of the set of sensors and be presented to the user. Likewise, the computing apparatus can register the motion sequence provided after processing 180 the measurements within the radiofrequency signal together with data indicative of the authenticated 170 user or deemed user.

The methods 100 preferably also comprise, upon finishing the motion tracking procedure carried out in step 180, a step 185 whereby the computing apparatus terminates the established 150 wireless communications connections with the sensors, thereby making possible to have the motion of other users tracked once the sensors they wear connect with the computing apparatus by way of the steps of the methods 100.

In this text, the terms first, second, third, etc. have been used herein to describe several devices, elements or parameters, it will be understood that the devices, elements or parameters should not be limited by these terms since the terms are only used to distinguish one device, element or parameter from another. For example, the first time period could as well be named second time period, and the second time period could be named first time period without departing from the scope of this disclosure.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A method for establishing wireless communications connections between a plurality of sensors of a motion tracking system and a computing apparatus of the motion tracking system, each sensor being adapted for arrangement on a body of a user, the method comprising:
   processing, by the computing apparatus, radiofrequency signals received by the computing apparatus and transmitted by each sensor of the plurality of sensors, each radiofrequency signal including an advertisement package of the respective sensor;
   providing, by the computing apparatus, a plurality of received signal strength indicators, RSSI, per each sensor of the plurality of sensors based on the processed radiofrequency signals;
   computing and storing, by the computing apparatus, mean RSSI values, $RSSI_{mean}$, based on the pluralities of RSSI so that a plurality of $RSSI_{mean}$ values is computed per sensor;
   computing, by the computing apparatus, velocities of change of $RSSI_{mean}$, $V_{RSSI}$, based on the pluralities of $RSSI_{mean}$ values so that a plurality of $V_{RSSI}$ values is computed per sensor; and
   establishing, by the computing apparatus, the wireless communications connections between the computing apparatus and a set of sensors of the plurality of sensors for which at least the following is fulfilled: the computing apparatus determines that at least some $V_{RSSI}$ values within a first time period of the plurality of $V_{RSSI}$ values of each sensor of the set of sensors has a modulus greater than a predetermined minimum velocity;
   wherein the predetermined minimum velocity is equal to or greater than zero.

2. The method of claim 1, wherein the connections are established between the computing apparatus and the set of sensors for which the computing apparatus determines that some $V_{RSSI}$ values of each sensor of the set of sensors are greater than the predetermined minimum velocity.

3. The method of claim 1, wherein the connections are established between the computing apparatus and the set of sensors whereby:
   the computing apparatus determines that one or more $V_{RSSI}$ values within a second time period of the plurality of $V_{RSSI}$ values of each sensor of the set of sensors are within a predetermined velocity range; and
   the computing apparatus etermines that the $RSSI_{mean}$ values for computing each $V_{RSSI}$ of said one or more $V_{RSSI}$ values are greater than a predetermined motionless threshold; and
   wherein the predetermined velocity range at least comprises a value of zero.

4. The method of claim 3, wherein when the set of sensors comprises a number of sensors greater than a number of wireless communications connections that the computing apparatus established, the computing apparatus establishes connections with the sensors of the set of sensors having the $RSSI_{mean}$ values for computing each $V_{RSSI}$ of said one or more $V_{RSSI}$ values that have a smallest difference with respect to the $RSSI_{mean}$ values for computing each $V_{RSSI}$ of said one or more $V_{RSSI}$ values of other sensors of the set of sensors.

5. The method of claim 1, further comprising after establishing the connections, not establishing, by the computing apparatus, any wireless communications connections between the computing apparatus and sensors different from those of the set of sensors until the established connections are first terminated.

6. The method of claim 1, further comprising not establishing, by the computing apparatus, wireless communications connections between the computing apparatus and one or more sensors of the plurality of sensors for which at least one of the criteria for establishing the wireless communications connections is not fulfilled.

7. The method of claim 1, further comprising, after establishing the connections:
   processing, by the computing apparatus, radiofrequency signals received by the computing apparatus and transmitted by each sensor of the set of sensors when the wireless communications connections are established, each radiofrequency signal including first identification data of the respective sensor;

processing, by the computing apparatus, the first identification data of the radiofrequency signals; and one of:

authenticating the user, by the computing apparatus, when the processed respective first identification data for all sensors of the set of sensors match or cooperate with corresponding second identification data for each respective sensor, the corresponding second identification data being stored in or being digitally accessible by the computing apparatus together with identification data of the user; or terminating, by the computing apparatus, the wireless communications connections between the computing apparatus and all the sensors of the set of sensors when the processed respective first identification data of at least one sensor of the set of sensors does not match or cooperate with corresponding second identification data for the respective at least one sensor.

8. The method of claim 7, further comprising, after authenticating the user, at least one of:

retrieving, by the computing apparatus, a routine of exercises to be performed by the authenticated user; or processing, by the computing apparatus, radiofrequency signals received by the computing apparatus and transmitted by each sensor of the plurality of sensors when the user is authenticated such that measurements included in the said radiofrequency signals are processed in order to provide a motion sequence of the user.

9. A data processing apparatus adapted to at least wirelessly receive radiofrequency signals, the data processing apparatus comprising at least one processor adapted to at least perform:

processing radiofrequency signals received by the data processing apparatus and wirelessly transmitted by each sensor of a plurality of sensors, each sensor comprising one or more of: an accelerometer, a gyroscope, or a magnetometer, wherein each radiofrequency signal includes an advertisement package of the respective sensor;

providing a plurality of received signal strength indicators, RSSI, per each sensor of the plurality of sensors based on the processed radiofrequency signals;

computing and storing mean RSSI values, $RSSI_{mean}$, based on the pluralities of RSSI so that a plurality of $RSSI_{mean}$ values is computed per sensor;

computing velocities of change of $RSSI_{mean}$, $V_{RSSI}$, based on the pluralities of $RSSI_{mean}$ values so that a plurality of $V_{RSSI}$ values is computed per sensor; and establishing wireless communications connections between the data processing apparatus and a set of sensors of the plurality of sensors for which at least the following is fulfilled: the at least one processor determines that at least some $V_{RSSI}$ values within a first time period of the plurality of $V_{RSSI}$ values of each sensor of the set of sensors has a modulus greater than a predetermined minimum velocity, wherein the predetermined minimum velocity is equal to or greater than zero.

10. The data processing apparatus of claim 9, wherein the connections are established between the data processing apparatus and the set of sensors for which the following is further fulfilled: the at least one processor determines that the some VRSSI values of each sensor of the set of sensors are greater than the predetermined minimum velocity.

11. The data processing apparatus of claim 9, wherein the connections are established between the data processing apparatus and the set of sensors for which the following is further fulfilled:

the at least one processor determines that one or more $V_{RSSI}$ values within a second time period of the plurality of $V_{RSSI}$ values of each sensor of the set of sensors are within a predetermined velocity range; and the at least one processor determines that the $RSSI_{mean}$ values for computing each $V_{RSSI}$ of said one or more $V_{RSSI}$ values are greater than a predetermined motionless threshold;

wherein the predetermined velocity range at least comprises a value of zero.

12. The data processing apparatus of claim 11, wherein when the set of sensors comprises a number of sensors greater than a number of wireless communications connections that the data processing apparatus can have established, the at least one processor establishes connections with the sensors of the set of sensors having the $RSSI_{mean}$ values for computing each $V_{RSSI}$ of said one or more $V_{RSSI}$ values that have a smallest difference with respect to the $RSSI_{mean}$ values for computing each $V_{RSSI}$ of said one or more $V_{RSSI}$ values of other sensors of the set of sensors.

13. The data processing apparatus of claim 9, wherein the at least one processor is adapted to at least further perform: after establishing the connections, not establishing any wireless communications connections between the data processing apparatus and sensors different from those of the set of sensors until the established connections are first terminated.

14. The data processing apparatus of claim 9, wherein the at least one processor is adapted to at least further perform: not establishing wireless communications connections between the data processing apparatus and one or more sensors of the plurality of sensors for which at least one of the criteria for establishing the wireless communications connections is not fulfilled.

15. The data processing apparatus of claim 9, wherein the at least one processor is adapted to at least further perform, after establishing the connections:

processing radiofrequency signals received by the data processing apparatus and transmitted by each sensor of the set of sensors when the wireless communications connections are established, each radiofrequency signal including first identification data of the respective sensor;

processing the first identification data of the radiofrequency signals; and one of:

authenticating a user when the processed respective first identification data for all sensors of the set of sensors match or cooperate with corresponding second identification data for each respective sensor, the corresponding second identification data being stored in or being digitally accessible by the at least one processor together with identification data of the user; or terminating the wireless communications connections between the data processing apparatus and all the sensors of the set of sensors when the processed respective first identification data of at least one sensor of the set of sensors does not match or cooperate with corresponding second identification data for the respective at least one sensor.

16. The data processing apparatus of claim 15, wherein the at least one processor is adapted to at least further perform, after authenticating the user, at least one of:

retrieving a routine of exercises to be performed by the authenticated user; or processing radiofrequency signals received by the data processing apparatus and transmitted by each sensor of the plurality of sensors when the user is authenticated such that measurements included in the said radiofrequency signals are processed in order to provide a motion sequence of the user.

17. A non-transitory computer-readable medium comprising instructions which, when executed by a device, cause the device to at least carry out the following:

processing radiofrequency signals received by the device and wirelessly transmitted by each sensor of a plurality of sensors, each sensor comprising one or more of: an accelerometer, a gyroscope and a magnetometer, wherein each radiofrequency signal includes an advertisement package of the respective sensor;

providing a plurality of received signal strength indicators, RSSI, per each sensor of the plurality of sensors based on the processed radiofrequency signals;

computing and storing mean RSSI values, $RSSI_{mean}$, based on the pluralities of RSSI so that a plurality of $RSSI_{mean}$ values is computed per sensor;

computing velocities of change of $RSSI_{mean}$, $V_{RSSI}$, based on the pluralities of $RSSI_{mean}$ values so that a plurality of $V_{RSSI}$ values is computed per sensor; and establishing wireless communications connections between the device and a set of sensors of the plurality of sensors for which at least the following is fulfilled: the device determines that at least some $V_{RSSI}$ values within a first time period of the plurality of $V_{RSSI}$ values of each sensor of the set of sensors has a modulus greater than a predetermined minimum velocity, wherein the predetermined minimum velocity is equal to or greater than zero.

18. The non-transitory computer-readable medium of claim 17, wherein the instructions cause the device to establish the connections between the device and the set of sensors for which the following is further fulfilled: the device determines that the some $V_{RSSI}$ values of each sensor of the set of sensors are greater than the predetermined minimum velocity.

19. The non-transitory computer-readable medium of claim 17, wherein the instructions cause the device to establish the connections between the device and the set of sensors for which the following is further fulfilled:

the device determines that one or more $V_{RSSI}$ values within a second time period of the plurality of $V_{RSSI}$ values of each sensor of the set of sensors are within a predetermined velocity range; and the device determines that the $RSSI_{mean}$ values for computing each $V_{RSSI}$ of said one or more $V_{RSSI}$ values are greater than a predetermined motionless threshold;

wherein the predetermined velocity range at least comprises a value of zero.

20. The non-transitory computer-readable medium of claim 18, wherein when the set of sensors comprises a number of sensors greater than a number of wireless communications connections that the device can have established, the device establishes connections with the sensors of the set of sensors having the $RSSI_{mean}$ values for computing each $V_{RSSI}$ of said one or more $V_{RSSI}$ values that have a smallest difference with respect to the $RSSI_{mean}$ values for computing each $V_{RSSI}$ of said one or more $V_{RSSI}$ values of other sensors of the set of sensors.

* * * * *